US005324231A

United States Patent [19]

Van Herpe et al.

[11] Patent Number: 5,324,231

[45] Date of Patent: Jun. 28, 1994

[54] STONE TRAP FOR A COMBINE HARVESTER

[75] Inventors: Francois Van Herpe, Vlierzele; Antoon G. Vermeulen, Ruddervoorde-Oostkamp; Marc R. M. Jonckheere, Jabbeke, all of Belgium

[73] Assignee: Ford New Holland, Inc., New Holland, Pa.

[21] Appl. No.: 937,810

[22] Filed: Aug. 28, 1992

[30] Foreign Application Priority Data

Aug. 30, 1991 [GB] United Kingdom ................. 9118623

[51] Int. Cl.[5] ........................ A01D 75/18; A01F 29/16

[52] U.S. Cl. ...................................... 460/106; 460/119

[58] Field of Search ......................... 460/105, 106, 119

[56] References Cited

U.S. PATENT DOCUMENTS 3,433,230 3/1969 Larsen .

4,146,038 3/1979 DeBusscher et al. .............. 460/105

4,446,875 5/1984 Deleu .

4,538,625 9/1985 Fortune et al. ...................... 460/105

5,019,014 5/1991 Hirsch et al. ........................ 460/106

FOREIGN PATENT DOCUMENTS 0385146 9/1990 European Pat. Off. .

2600833 7/1976 Fed. Rep. of Germany .

1295199 11/1972 United Kingdom .

*Primary Examiner*—Terry Lee Melius

*Attorney, Agent, or Firm*—Frank A. Seemar; Larry W. Miller

[57] ABSTRACT

A combine harvester stone trap having its upwardly facing inlet generally in the proximity of the transition between the discharge end of the crop elevator and the forward end of the combine threshing concave. The stone trap includes a front wall in the form of a door which can be opened into a retracted position for emptying the stone trap and a rear wall which, in an operative position, effectively closes the gap between the forward end of the threshing concave and the forward end of the combine grain pan located below the concave in a conventional manner. The rear wall is movable into an inoperative position providing access to the gap between the forward ends of the threshing concave and the grain pan.

6 Claims, 5 Drawing Sheets

24
65
37
36
27
26
28
23
25
3
71
67
50
49
64
4
72
51
68
74
73
15
16
53
52
13
54
58
59
57
60
14
11
12
61
63
62
10

STONE TRAP FOR A COMBINE HARVESTER

FIELD OF THE INVENTION

The present invention relates generally to crop harvesting machines, commonly referred to as combine harvesters, and, more particularly to so-called stone traps fitted thereon for collecting stones and other hard foreign objects which may be entrained in the crop material fed to the threshing mechanism. Such stone traps permit easy removal of the trapped stones and other objects from the combine harvester.

BACKGROUND OF THE INVENTION

When harvesting windrowed crops with a pick-up attachment mounted on the header of a combine harvester or when cutting the crops close to the ground surface with a direct-cut attachment, stones and other hard foreign objects inadvertently may be picked up and fed to the threshing mechanism, which thereby is exposed to severe damage. To prevent these foreign objects from entering the threshing mechanism, combine harvesters commonly are equipped with a trough-shaped stone trap disposed between the threshing mechanism and the normal crop elevator which conveys crop material from the crop gathering attachment to this threshing mechanism. Foreign objects which are fed towards the threshing mechanism are hit by threshing bars thereof and, as a result, are projected into the stone trap.

The crop elevator commonly is in the form of a feeder housing enclosing a chain-and-slat apron conveyor which entrains crop material and feeds the same rearwardly through a discharge opening of the feeder housing proximate to the threshing mechanism. The stone trap thus is positioned with its inlet opening generally at the transition between said discharge opening and the threshing mechanism with the stone trap itself being positioned below the plane of that transition. In other words, as seen from the front of the combine, the stone trap is positioned below the rearward end of the feeder housing.

Details of a combine harvester equipped with a conventional stone trap can be taken from EP-A-0.096.923, the content of which is included herein by reference.

As can be seen from the aforementioned prior art document, the stone trap obstructs access from underneath the crop elevator to the grain pan; said grain pan being disposed beneath the threshing mechanism and extending rearwardly into the machine from the vicinity of the rear wall of the stone trap for conveying threshed crop material, received from the threshing mechanism, to the cleaning mechanism for further processing. During operation in wet crop conditions, dirt may accumulate on the surface of the grain pan and, when this occurs, cleaning of the grain pan becomes necessary. Access to the grain pan for removing accumulated dirt normally is possible only from the rear of the machine by reaching over the cleaning apparatus. This is a difficult task and, as a consequence, there is substantial operator reluctance to carry out this grain pan cleaning as frequently as is required.

Access to the grain pan from the forward end of the machine at a location beneath the discharge end of the crop elevator is possible in the arrangements according to CA-A-991.937, DE-A-2.013.289 and DE-A-2.523.715 by providing means which permit the grain pan or parts thereof to swing downwardly for servicing. However, this is a complicated and hence also an expensive solution.

SUMMARY OF THE INVENTION

It is therefore an objective of the present invention to provide a simple and inexpensive solution which permits convenient access to the grain pan from a position in the vicinity of the inlet opening to the threshing mechanism, i.e. at the transition between the crop elevator and the threshing mechanism.

This objective is accomplished by providing a combine harvester with a stone trap having its upwardly facing inlet generally in the proximity of the transition between the discharge end of the crop elevator and the forward end of the threshing concave and which is characterized in that said stone trap comprises a front wall in the form of a door which can be opened into a retracted position for emptying the stone trap and a rear wall which, in an operative position, closes the gap between the forward end of the threshing concave and the forward end of the grain pan and which is movable into a retracted, inoperative position providing access to the gap through the stone trap area.

In one embodiment of this invention, the stone trap rear wall is releasably attached to the combine framework at a position closing the gap between the forward end of the threshing concave and a frame member in the vicinity of the forward end of the grain pan. A flexible seal may be coupled at one end to this stone trap rear wall and at the other end to the forward edge of the grain pan in a manner to avoid interference with the conventional oscillatory movement of the grain pan while preventing the leaking of any crop material from the machine at this location.

From what precedes, it will be appreciated that, when the stone trap access door is opened and furthermore the stone trap rear wall is detached from its mounting supports, access to the forward end of the grain pan from underneath the crop elevator is provided. The stone trap rear wall is removable from the combine harvester in case the flexible seal is not coupled to the stone trap rear wall. However, in case, as is preferred, the flexible seal is provided in the manner as has been described hereabove and the stone trap rear wall is disconnected from its mountings on the machine framework, this wall may be moved in a forward and downward direction until the seal prevents the wall to be displaced any further and until it rests on the stone trap door which is then placed in its opened position; the arrangement being so that both the door and the rear wall are clear of the forwardly facing access opening to the forward end of the grain pan at the location beneath the forward portion of the conventional threshing concave.

Alternatively, the stone trap rear wall may be hingeably mounted on the framework. Preferably, the hinges of the stone trap door and the stone trap rear wall extend coaxially and in the vicinity of the forward end of the grain pan. In this case, the stone trap door and the stone trap rear wall both may be pivoted forwardly and downwardly into retracted, inoperative positions clear of the access to the grain pan forward end. Also, provisions may be made for positively holding the stone trap rear wall in its operative position when the stone trap door is in its closing position and the arrangement may be so that no tools are needed for moving both the stone trap door and the stone trap rear wall into the retracted, inoperative positions.

Again a flexible sealing member may be provided in a manner to avoid interference with the conventional oscillatory movement of the grain pan while preventing leakage of crop material from the machine at the forward end of said grain pan. However, in this embodiment, the flexible sealing member preferably is coupled to the aforementioned frame member in the vicinity of the hinge rather than to the stone trap rear wall.

With either one of these extremely simple and inexpensive arrangements, a cleaning of the grain pan is possible from the front end thereof. Also, access to the threshing mechanism and, in particular, the threshing concave is greatly facilitated which is useful for servicing the same. Access to the threshing cylinder is also improved in case the intake end of the threshing concave is coupled to the concave support means in a manner which permits easy disassembly of this coupling; the arrangement being so that this concave intake end may be lowered onto the grain pan after it has been disconnected from the support means, thus providing access to the threshing cylinder.

Access to the forward end of the grain pan and the threshing mechanism may be even further facilitated by disconnecting the crop elevator from the base unit as is conventional. However, as this is a rather cumbersome operation, it preferably should be avoided and the present invention makes this possible.

The foregoing and other objects, features and advantages of the invention will appear more fully hereinafter from a consideration of the detailed description which follows, in conjunction with the accompanying sheets of drawings wherein one principal embodiment of the invention is illustrated by way of example. An alternative embodiment is also illustrated. It is to be expressly understood, however, that the drawings are for illustrative purposes and are not to be construed as defining the limits of the invention.

DESCRIPTION OF THE PREFERRED EMBODIMENT

In the following description, terms such as "forward", "rearward", "left", "right", etc... are used, which are words of convenience and which are not to be construed as limiting terms.

Figure 1:
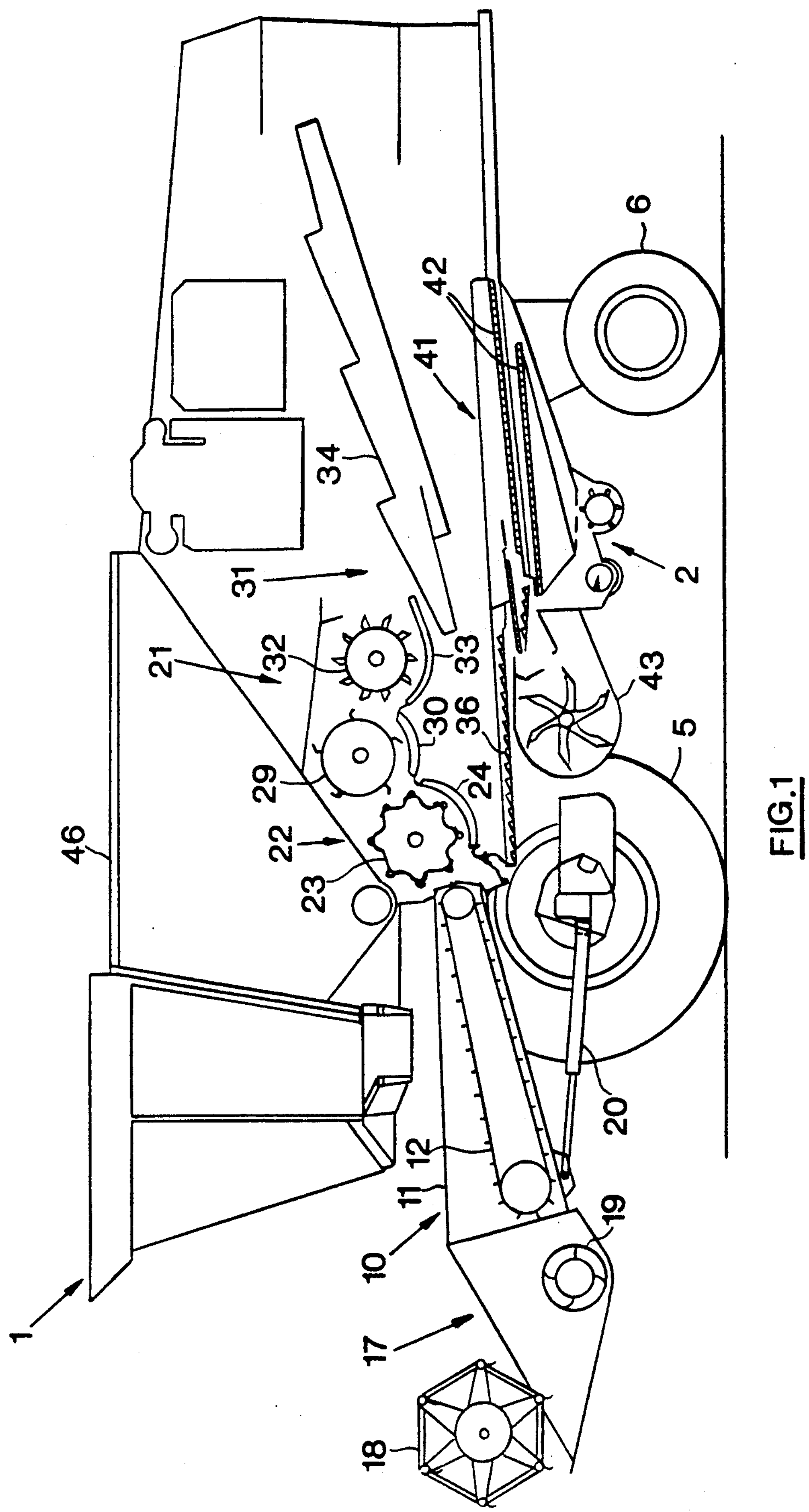
FIG. 1 is a schematic fore-and-aft sectional view of a combine harvester incorporating the present invention.

Referring now to the drawings and particularly to FIG. 1, a crop harvesting machine 1, commonly referred to as a self-propelled combine harvester, can be seen.

The combine base unit 2 comprises a wheeled frame or housing 3 supported on a front pair of traction wheels 5 and a rear pair of steerable wheels 6 for movement over a field to harvest crop material. Pivotally mounted to the front of the base unit 2 is a crop elevator 10 including a feeder house 11 at the front end of which is mounted a crop harvesting header 17 of conventional design.

In general, the header 17 includes a forwardly disposed reciprocating cutter bar (not shown) for severing crop material from the stubble. A reel 18 is disposed above and forwardly of the cutter bar to sweep crop material thereover and transport it rearwardly to a consolidating auger 19 where it is converged centrally of the machine and then elevated to threshing and separating means 21 by an elevator 12 of conventional construction in the feeder house 11. Basically, the threshing part 22 of the threshing and separating means 21 consists of a threshing cylinder 23 and a straw beater 29, each provided with respective cooperating concave means 24 and 30. The separating part 31 of said threshing and separating means 21 comprises a separator drum 32 together With an associated separator concave 33 as well as a set of longitudinally extending straw walkers 34.

Most of the grain is separated from the straw by the threshing cylinder 23 and associated concave means 24. Crop material issuing from between the threshing cylinder 23 and concave 24 is subjected to the action of the straw beater 29 and passes therefrom to the separator drum 32 and associated concave 33 and thence to the straw walkers 34, all of which effect further separation of grain from the remainder of the crop material.

Wanted grain together with chaff material, which is separated through the concave means 24, 30 and 33, falls onto a grain pan 36 and is transported towards a cleaning apparatus 41 comprising sieve assembly 42 and a cleaning fan 43. Wanted grain together with chaff material, which is separated in the straw walkers 34, falls directly onto the cleaning apparatus 41. The grain pan 36 and the sieve assembly 42 are oscillated generally back-and-forth for moving the threshed and separated material therealong while permitting the passage of cleaned grain by gravity through the sieves 42. The material on the sieve assembly 42 is subjected to a cleaning action by the fan 43 which serves to blow air through the sieve assembly 42 in order to remove the chaff and other impurities, such as dust, from the grain by making this discardable material airborne for discharge from the machine. Clean grain is collected underneath the sieve assembly 42 from where it subsequently is transferred to a grain tank 46 on top of the combine base unit 2.

Figure 2:
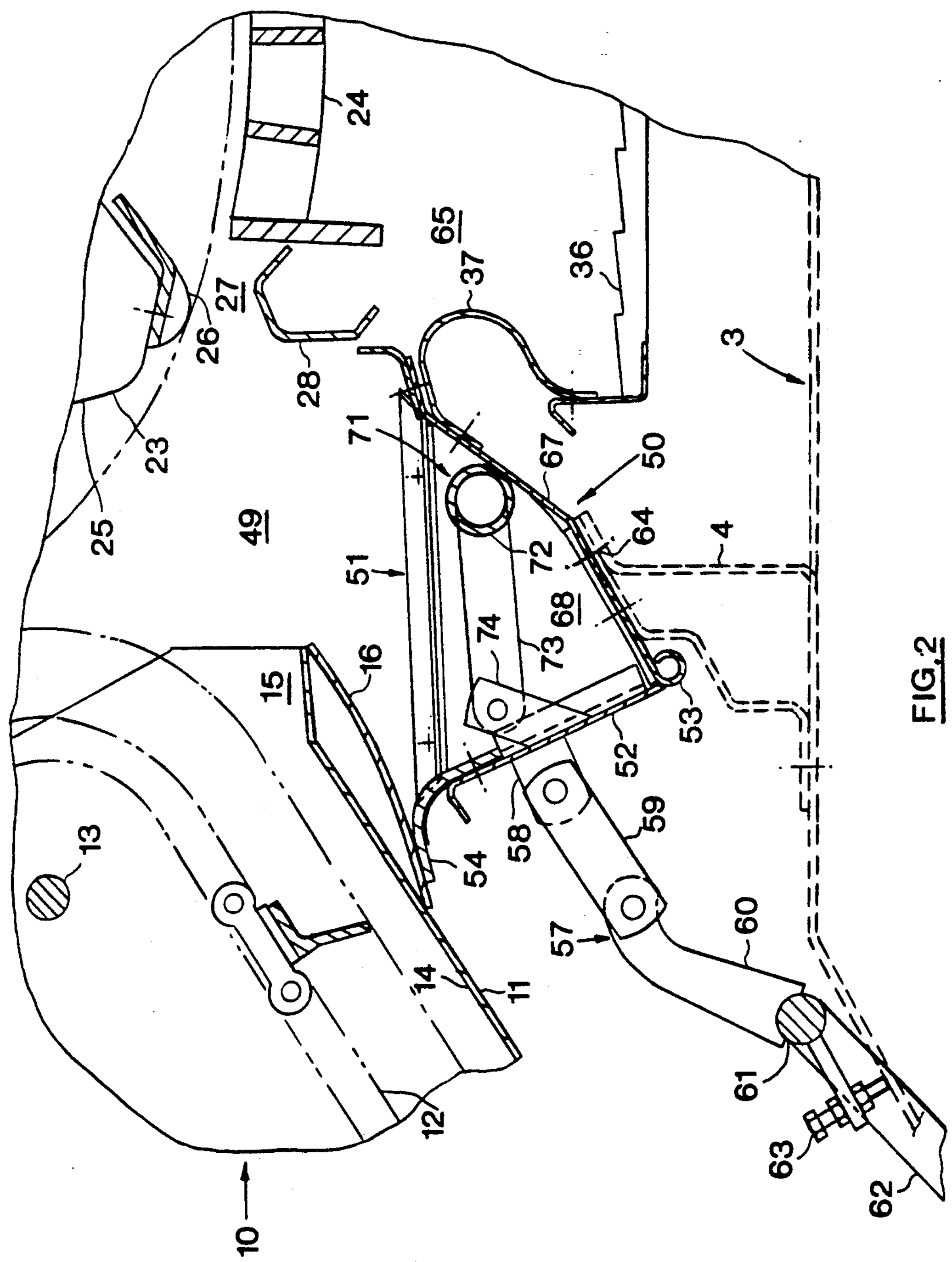
FIG. 2 is a fore-and-aft sectional view of the transitional area between the elevator housing and the threshing mechanism and including the stone trap provided generally at the forward end of the grain pan; the stone trap being shown in its closed, foreign objects trapping position.
Figure 3:
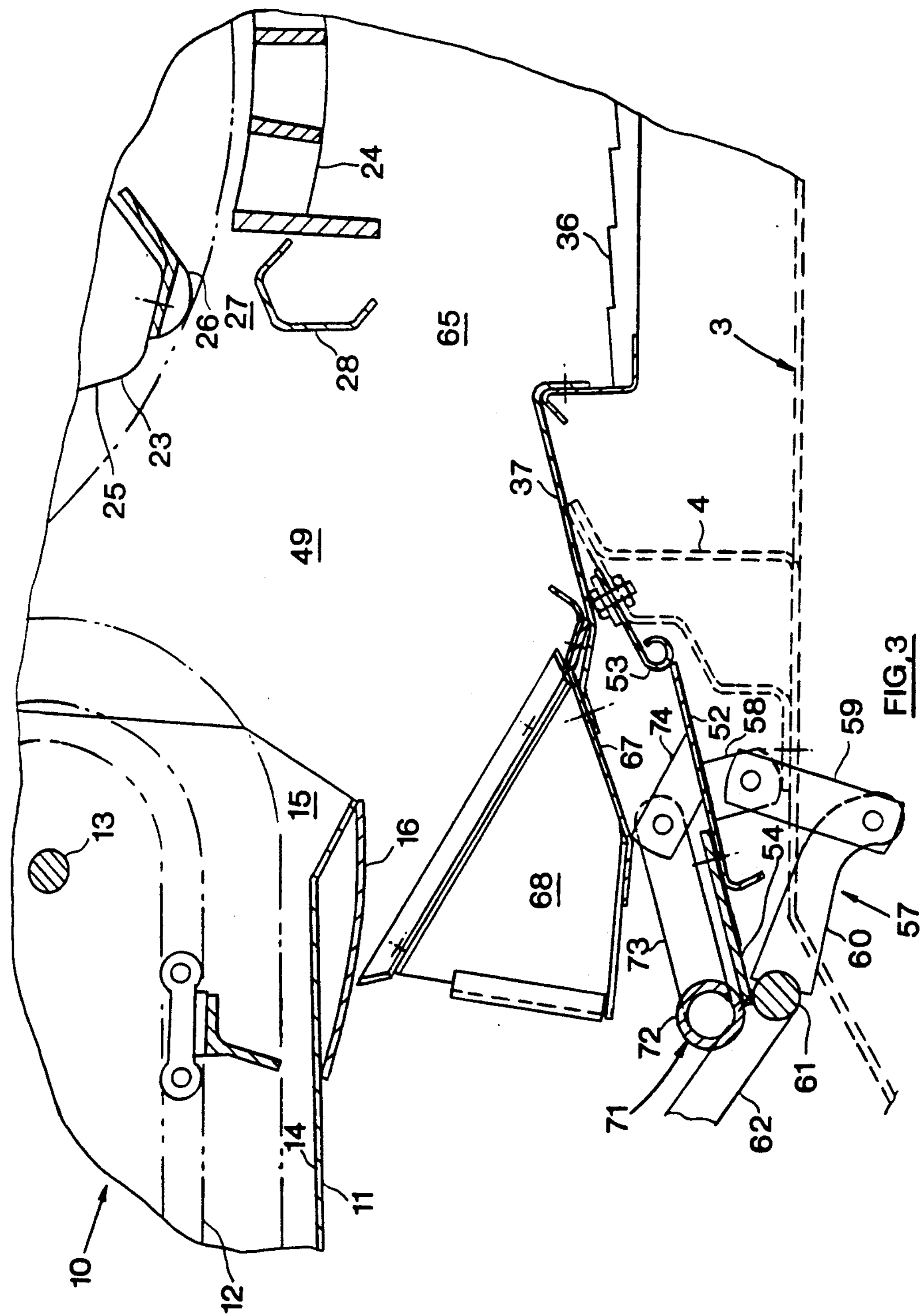
FIG. 3 is a view similar to FIG. 2 but showing the stone trap parts in positions permitting access to the grain pan from underneath the crop elevator.

With reference to FIGS. 2 and 3, the configuration of the crop elevator 10 and the threshing means 22 will now be described in further details. Typically, the elevator 12 in the feeder house 11 is in the form of an endless apron conveyor comprising transverse slats and is driven by a drive shaft 13 positioned adjacent the rearward (upper discharge) end of the feeder house 11; the sense of rotation being so that the conveyor 12 operates in an undershot manner, i.e. crop material engaged thereby is conveyed upwardly between the underside of the apron conveyor 12 and a bottom plate 14 of the feeder house 11. The orientation of the feeder house 11 relative to the combine base unit 2 and hence, also the height of the header 17 relative to the ground, is controlled by a pair of hydraulic lift cylinders 20 interconnecting the feeder house 11 and the base unit 2.

The threshing means 22 are provided rearwardly of the elevator housing discharge end 15 and the threshing cylinder 23 thereof comprises flanges 25 upon which rasp bars 26 are mounted.

Viewing now the transition area 49 between the crop elevator 10 and the threshing means 22, a stone trap 50 in accordance with the present invention is provided with its inlet 51 generally beneath this area 49 to collect and store stones and other hard, foreign objects which accidentally are picked up by the header 17 and fed rearwardly in the direction toward the threshing and separating mechanism 21. During operation, the layer of crop material passes directly from the crop elevator discharge end 15 through the transition area 49 to the intake nip 27 between the threshing cylinder 23 and the associated concave 24 and thus bridges over the stone trap inlet 51. Any hard, foreign objects in excess of a minimum size in the crop layer are hit by any one of the rasp bars 26 of the threshing cylinder 23 as they tend to enter said nip 27 and are deflected thereby into the stone trap 50 where they are collected for later discharge as is conventional.

Still with reference to FIGS. 2 and 3, the construction and operation of a first embodiment of the stone trap 50 according to the present invention will now be described in more detail. This stone trap 50 is generally triangular in cross section with the sides thereof being formed by respectively a fixed wall 67 attached to a transverse beam 4 of the machine framework 3 and extending upwardly and reaching into the immediate vicinity of the threshing concave intake profile 28 thus effectively closing the gap 65 between the forward ends of respectively the threshing concave 24 and the grain pan 36, a front door 52 hingeably connected at its lower edge to a hinge 53 attached to said transverse beam 4 adjacent the corresponding lower edge of the rear wall 67 and the upwardly facing inlet 51 disposed generally beneath the aforementioned transition area 49. The stone trap 50 further also comprises transversely opposite, generally fore-and-aft extending end walls 68 which are fixedly connected to the rear wall 67.

The stone trap door 52 is provided at its upper edge with a conventional, flexible seal 54 which is disposed to sealingly engage with a curved surface portion 16 of the elevator bottom wall 14 adjacent the elevator discharge end 15. Unlike in conventional combine harvesters, the center of curvature of this surface portion 16 is situated in front of the pivotal mounting of the crop elevator 10 on the combine base unit 2 (coaxially with the shaft 13) and preferably, the radius of curvature is substantially larger than the distance from the elevator pivot axis to said curved surface 16.

The stone trap front wall or door 52 can be opened and closed by means of an overcenter mechanism 57 comprising a handle 62 which extends to one side of the crop elevator 10 and which is connected to a transverse pivot shaft 61 to which also is connected an arm 60 which itself is pivotally connected via a link 59 to a lug 58 attached to the stone trap door 52. For closing the stone trap door 52, the handle 62 is lowered to the position shown in FIG. 2 thus moving the mechanism 57 overcenter until a stop 63 on the pivot shaft 61 becomes operational. For opening the stone trap door 52, the handle 62 is pivoted upwardly whereby the mechanism 57 goes overcenter in the opposite direction and the door 52 is pivoted into the position shown in FIG. 3.

Agitator means 71 are connected to the stone trap door 52 and comprise a tube, angle iron or other member 72 which extends across at least a major portion of the transverse width of the stone trap 50 when the door 52 is in its closing position. Said agitator member 72 is hinged at its opposite ends via a pair of arms 73 to mounting lugs 74 provided on the inner face of the stone trap door 52 and, when said door 52 is in its closing position, said member 72 is supported on the stone trap rear wall 67 generally adjacent the upper edge thereof.

As to this stone trap rear wall 67, it should be noted that, on the one hand, it is detachably mounted on the transverse beam 4 of the combine framework 3 via the intermediary of quickly releasable fasteners 64 and, on the other hand, a flexible seal 37 extends between this wall 67 and the leading edge of the grain pan 36 in a manner so as to avoid interference with the oscillatory movement of the latter during normal operation.

During this normal operation, the various components are placed in the positions as shown in FIG. 2 and the elevator may be pivoted as is required by the normal harvesting operation without any leakage occurring between the sealing 54 and the associated curved surface 16 of the elevator bottom wall 14.

The operator may empty the stone trap 50 from the side of the elevator 10, i.e. without having to crawl underneath this elevator 10, by opening the door 52 thereof by means of the overcenter mechanism 57. As the door 52 is being opened, the agitator member 72 is caused to move downwardly along the stone trap rear wall 67 to thereby assist in discharging the stone trap content. However, should this action fail to empty the stone trap 50 completely at once, then, the operator may repeatedly open and close the stone trap front wall 52 to thereby move the agitator member 72 back-and-forth through the stone trap 50 so as to ultimately remove the entire content thereof.

Access to the area between the threshing concave 24 and the grain pan 36 therebelow is possible from underneath the elevator 10 after the stone trap door 52 has been opened, the agitator means 71 have been brought into the position shown in FIG. 3 and the stone trap rear wall 67 has been detached from the frame member 4 and turned and displaced forwardly as far as permitted by the flexible seal 37. This front access greatly facilitates the servicing of the aforementioned area, such as cleaning of the grain pan 36 and/or the threshing concave 24. This access may be even further improved by disconnecting the crop elevator 10 from the base unit 2 and such further improved access may be desirable when there is a need for a major servicing of, e.g., the threshing mechanism. However, the elevator normally does not need to be disconnected when cleaning of the grain pan 36 is required.

Figure 4:
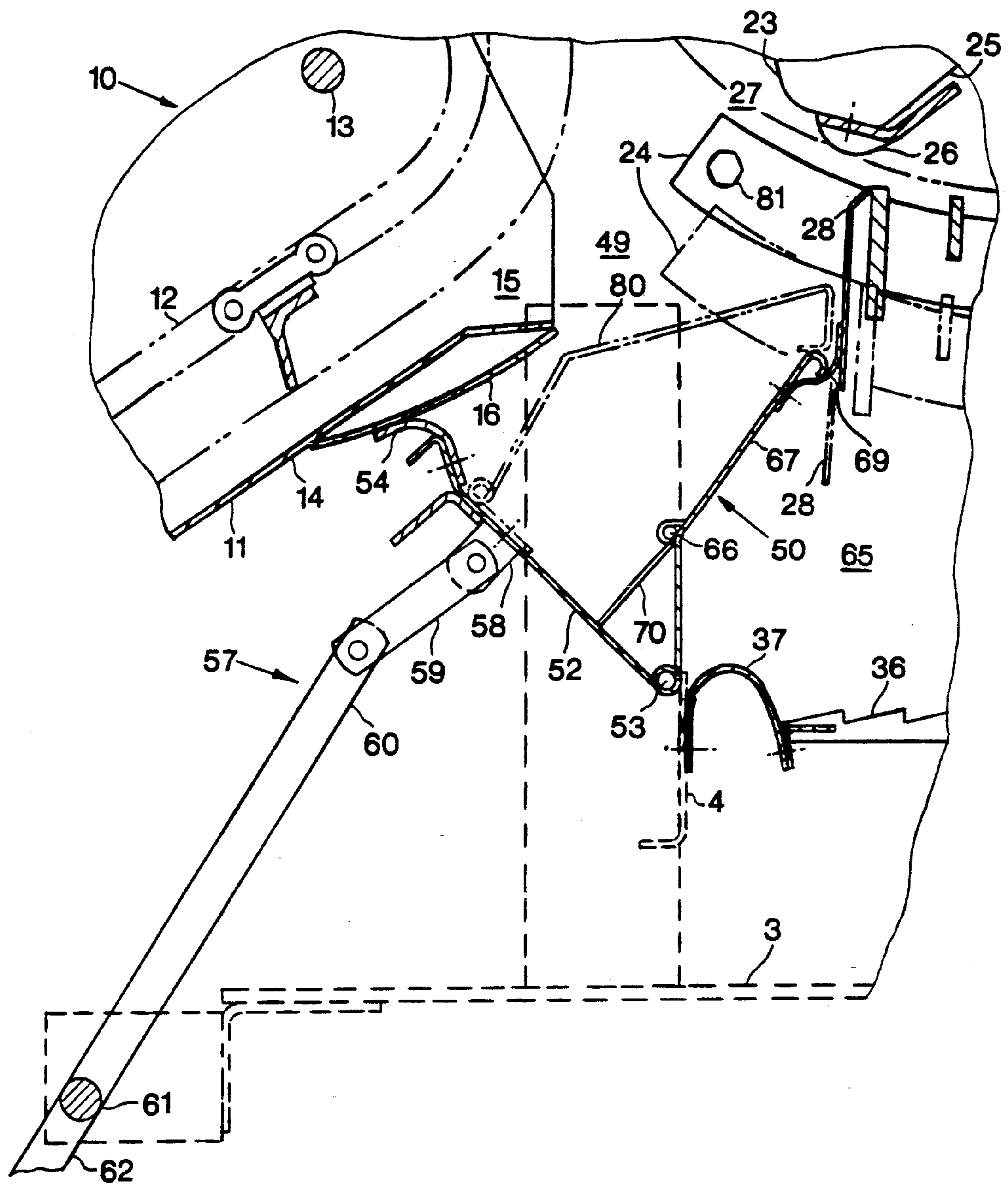
FIGS. 4 and 5 are views similar to FIGS. 2 and 3, respectively, but showing an alternative embodiment of the present invention.
Figure 5:
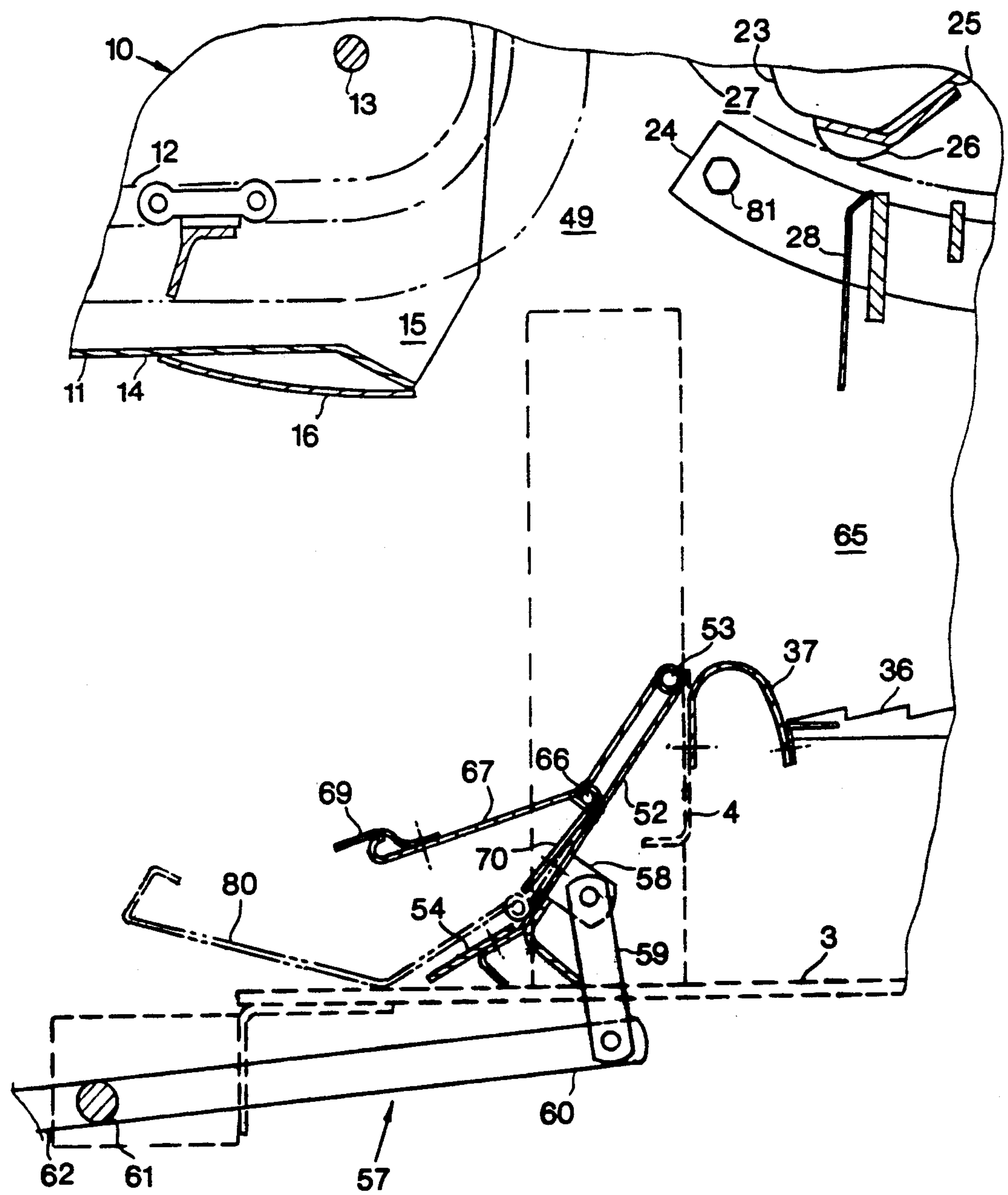

With reference to FIGS. 4 and 5, an alternative embodiment of will now be described. With respect to this embodiment, the same reference numbers are used for indicating those components which are either identical or similar to the corresponding components of the arrangement according to FIGS. 2 and 3.

As can be seen in the drawings, the stone trap rear wall 67 of this embodiment is pivotally mounted on the frame member 4 rather than being detachably connected thereto as is the case in the first embodiment. A flexible seal 69 may be provided at the upper edge of the rear wall 67 to sealingly engage with the intake profile 28 of the threshing concave 24 while still permitting adjustment of this concave 24 relative to the threshing cylinder 23 as is conventional and as is illustrated in FIG. 4 by means of showing the concave 24 in broken lines in a lowered position.

A latching pin 66 is slidably mounted on the stone trap rear wall 67 adjacent each one of its transverse edges in a manner to permit fixation of this rear wall 67 in its operative position by engaging these pins 66 with appropriate holes (not shown) in adjacent frame members. Each pin 66 may have a handle 70 connected thereto to facilitate the latching of the rear wall 67 in its operative position.

Alternatively or at the same time, each handle 70 may also be disposed so that its free end may be engaged by the stone trap door 52 when the latter is moved to its closing position and thus, in this case, handles 70 effectively also are abutment members. With this arrangement, it is not necessary to actually engage the pins 66 with the corresponding holes in the adjacent frame members (and thus these pins then may be mere pivots) in case the handles or abutment members 70 are dimensioned and positioned so that, with the stone trap door 52 in its closing position, the stone trap rear wall 67 is held thereby against appropriate abutments (not shown) on the frame in its operative position. The abutment members 70 may be provided with appropriate stops which, in combination with gravity, place these members 70, when the rear wall 67 is in its operative position, in the appropriate positions ready for engagement by the door 52 upon the closing thereof. On the other hand, when the rear wall 67 is pivoted towards its inoperative position shown in FIG. 5, the members 70 pivot by gravity to the retracted position as is illustrated.

The flexible seal 37 associated with the grain pan 36 extends between this grain pan 36 and the frame member 4 rather than the stone trap rear wall 67.

As is conventional, a stone trap filler plate 80 may be used in situations where the stone trap 50 is not needed, i.e., when there exist no risks for solid, foreign objects to be picked up together with the crop material. This is the case when harvesting rice or corn. Such a filler plate 80 is intended to prevent material from entering the stone trap 50 when harvesting said crops. In the arrangement according to FIGS. 4 and 5, such a filler plate 80 is pivotally attached to the inner face of the stone trap door 52 in the same manner as the agitator means 71 are connected to the door 52 in the arrangement according to FIGS. 2 and 3. In other words, the free end of the filler plate 80 also is caused to move downwardly along the stone trap rear wall 67 when the door 52 is opened and, furthermore, said filler plate 80 also can be swung to the retracted, inoperative position shown in FIG. 5 for improving the access to the area between the grain pan 36 and the threshing concave 24. Obviously, the filler plate 80 and the agitator means 71 need not and moreover also cannot be used at the same time.

From what precedes and as can be taken from FIG. 5, access from below the elevator 10 to the area above the forward end of the grain pan 36 is possible after the stone trap door 52, the filler plate 80, respectively the agitator means 71 and the stone trap rear wall 67 all are pivoted into their respective retracted, inoperative positions shown in FIG. 5. As in the first embodiment, such access permits, e.g., easy cleaning of the grain pan 36 and the concave 24 and, provided the concave 24 is connected at its transversely opposite forward ends to the conventional concave supporting mechanism (not shown) by couplings 81 which enable easy disassembly thereof, easy access is also provided to the threshing cylinder 23 in as much as couplings 81 can be released to permit a lowering of the forward end of the concave 24 until it rests on the grain pan 36 and so that the intake nip 27 between the threshing cylinder 23 and the associated concave 24 is opened in the direction of the area beneath the elevator 10. This access to the threshing cylinder 23 does not require the disconnection of the elevator 10 but, if the elevator 10 is nevertheless disconnected, access to the threshing cylinder 23 is even further improved.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A combine harvester stone trap having its upwardly facing inlet generally in the proximity of a transition between the discharge end of a crop elevator mounted on the frame of the combine harvester and the forward end of a threshing concave, said concave mounted on said frame and operatively disposed above an oscillating grain pan also mounted on said frame of the combine harvester, the improvement comprising a front wall in the form of a door which can be opened into a retracted position for emptying the stone trap, and a rear wall which, in an operative position, effectively closes the gap between the forward end of the threshing concave and the forward end of the grain pan and which is independently movable into a retracted, inoperative position providing access to said gap through the stone trap area under conditions where said front wall has been opened to its retracted position.

2. A combine harvester stone trap according to claim 1, wherein said rear wall is releasably attached to the combine frame at a position closing the gap between the forward end of the threshing concave to thereby permit said rear wall to be opened to its retracted position.

3. A combine harvester stone trap according to claim 2, wherein said improvement further comprises a flexible seal having first and second edges, said first edge attached to said stone trap rear wall and said second edge attached to the forward end of said grain pan in a manner to avoid interference with the oscillatory movement of said grain pan, said flexible seal, under conditions where said stone trap rear wall is in the inoperative position, clear of the access to the gap between the forward ends of said threshing concave and said grain pan and extending in a generally forward direction from said grain pan.

4. A combine harvester stone trap according to claim 3, wherein said rear wall in said inoperative position is displaced forwardly and extends in the same general direction as said seal.

5. A combine harvester stone trap according to claim 4, wherein said rear wall forward displacement is limited by the full extension of said seal.

6. A combine harvester stone trap according to claim 5, wherein said rear wall in said inoperative position is disposed generally above said front wall in said retracted position.

* * * * *